United States Patent
Zmievski et al.

(10) Patent No.: US 9,858,549 B2
(45) Date of Patent: Jan. 2, 2018

(54) BUSINESS TRANSACTION RESOURCE USAGE TRACKING

(71) Applicant: AppDynamics LLC, San Francisco, CA (US)

(72) Inventors: Andrei Zmievski, San Francisco, CA (US); Rama Krishna Tummala, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 397 days.

(21) Appl. No.: 14/171,595

(22) Filed: Feb. 3, 2014

(65) Prior Publication Data

US 2015/0222505 A1    Aug. 6, 2015

(51) Int. Cl.
| | | |
|---|---|---|
| *G06Q 10/10* | (2012.01) | |
| *H04L 12/24* | (2006.01) | |
| *H04L 12/26* | (2006.01) | |

(52) U.S. Cl.
CPC ......... *G06Q 10/10* (2013.01); *H04L 41/5058* (2013.01); *H04L 43/0817* (2013.01); *G06F 2201/87* (2013.01)

(58) Field of Classification Search
CPC .................................................. G06F 2201/87
See application file for complete search history.

(56) References Cited

U.S. PATENT DOCUMENTS

| | | | | |
|---|---|---|---|---|
| 7,519,702 B1* | 4/2009 | Allan | ...... | G06F 15/173 709/201 |
| 7,970,857 B2* | 6/2011 | Schneider | ...... | H04L 67/02 709/217 |
| 8,010,654 B2* | 8/2011 | Hunt | ...... | G06F 11/3409 709/224 |
| 2005/0050159 A1* | 3/2005 | Suraski | ...... | G06F 11/362 709/217 |
| 2006/0010449 A1* | 1/2006 | Flower | ...... | G06F 9/5033 718/102 |
| 2007/0067425 A1* | 3/2007 | McKinney | ...... | G06Q 10/00 709/223 |
| 2007/0083649 A1* | 4/2007 | Zuzga | ...... | G06F 11/3419 709/224 |
| 2007/0124479 A1* | 5/2007 | Faruquie | ...... | G06F 9/54 709/227 |
| 2008/0034082 A1* | 2/2008 | McKinney | ...... | G06F 11/3466 709/224 |
| 2008/0065702 A1* | 3/2008 | Dickerson | ...... | G06F 17/30306 |

(Continued)

OTHER PUBLICATIONS

U.S. Appl. No. 14/266,654, filed Apr. 30. 2014, Andrei Zmievski, Tracing Business Transactions Based on Application Frameworks.

*Primary Examiner* — Lashonda Jacobs
(74) *Attorney, Agent, or Firm* — Parker Ibrahim & Berg LLC; James M. Behmke; Stephen D. LeBarron (57) ABSTRACT

A system associates resource usage with a particular business transaction. A business transaction may include a PHP request and occur over a distributed system. The distributed application may be monitored. The resource usage by the requests that form the business transaction may be compiled together to determine the resource usage of the business transaction. The resources may include resources used by PHP requests, such as for example memory pool usage, files used, CPU usage, and other resources.

21 Claims, 5 Drawing Sheets

(56) References Cited

U.S. PATENT DOCUMENTS

| | | | |
|---|---|---|---|
| 2008/0168345 A1* | 7/2008 | Becker | G06F 17/30896 |
| | | | 715/242 |
| 2009/0144409 A1* | 6/2009 | Dickerson | G06F 11/3495 |
| | | | 709/224 |
| 2009/0254918 A1* | 10/2009 | Branda | G06F 9/505 |
| | | | 718/105 |
| 2010/0223322 A1* | 9/2010 | Mott | G06F 17/30905 |
| | | | 709/203 |
| 2010/0302248 A1* | 12/2010 | Houghtlin | G06Q 10/0637 |
| | | | 345/440 |
| 2011/0264790 A1* | 10/2011 | Haeuptle | G06F 11/3495 |
| | | | 709/224 |
| 2012/0096004 A1* | 4/2012 | Byrd | G06Q 40/04 |
| | | | 707/740 |
| 2014/0250436 A1* | 9/2014 | Tang | G06F 9/45533 |
| | | | 718/1 |
| 2015/0032884 A1* | 1/2015 | Greifeneder | H04L 67/10 |
| | | | 709/224 |
| 2015/0067031 A1* | 3/2015 | Acharya | H04W 4/003 |
| | | | 709/203 |

\* cited by examiner

BUSINESS TRANSACTION RESOURCE USAGE TRACKING

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services that provide the web application. As more and more businesses rely on a network presence to conduct business, the efficiency and reliability of these web services that they provide becomes more important. Typically, performance for business web services has been measured based on the response time of a uniform resource locator. (URL). Though URL may be easy to determine resource usage with, it does not give a true indication of what portion of a web service may be performing well or not performing well at all.

What is needed is an improved method for determining performance of a web based service.

SUMMARY OF THE CLAIMED INVENTION

The present technology associates resource usage with a particular business transaction. In some embodiments, a business transaction that involves a PHP: hypertext preprocessor (PHP) request and occurs over a distributed system is monitored. The resource usage by the requests that form the business transaction may be compiled together to determine the resource usage of the business transaction. The resources may include resources used by PHP requests, such as for example memory pool usage, files used, CPU usage, and other resources.

The present technology associates resource usage with a particular business transaction. In some embodiments, a business transaction that involves a PHP: hypertext preprocessor (PHP) request and occurs over a distributed system is monitored. The resource usage by the requests that form the business transaction may be compiled together to determine the resource usage of the business transaction. The resources may include resources used by PHP requests, such as for example memory pool usage, files used, CPU usage, and other resources.

An embodiment may include a system for monitoring a business transaction. The system may include a processor, a memory and one or more modules stored in memory and executable by the processor. When executed, the one or more modules may receive a PHP request, determine a usage of a resource with the PHP request, and determine the resource usage by a business transaction, the business transaction including a plurality of requests that include the PHP request.

DETAILED DESCRIPTION

The present technology associates resource usage with a particular business transaction. In some embodiments, a business transaction that involves a PHP request and occurs over a distributed system is monitored. The resource usage by the requests that form the business transaction may be compiled together to determine the resource usage of the business transaction. The resources may include resources used by PHP requests, such as for example memory pool usage, files used, CPU usage, and other resources.

A business transaction may be generated based on a request header, request footer, a cookie, or some other data associated with the request. A business transaction may span over multiple servers and may have a related business purpose, such as for example a "check out" operation at an e-commerce website.

Figure 1:
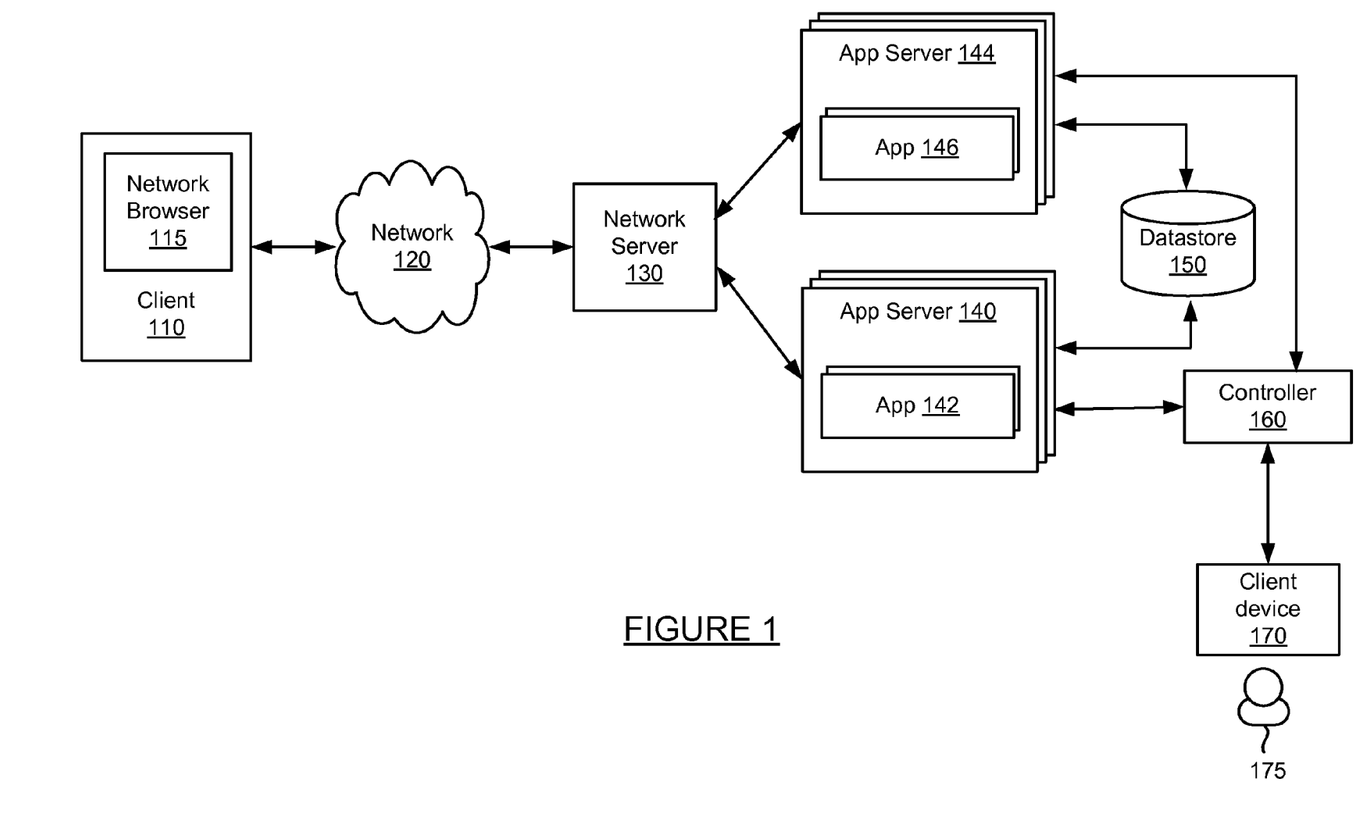
FIG. 1 is a block diagram of a system for performing the present technology.

FIG. 1 is a block diagram of a system for implementing the present technology. The system of FIG. 1 includes client 110, network 120, network server 130, application servers 140 and 144, data store 150, controller 160 and client device 170.

Client 110 may include any device through which a user may initiate a request over network 120 to servers 130-144. Client device 110 may include network browser 110 and be implemented as a computing device, such as for example a laptop, desktop, workstation, or some other computing device. Client device 110 may be implemented as a portable device, such as for example a mobile phone, smart phone, or other portable device. Network browser 110 may be a client application for viewing content provided by an application server, such as application server 140 via network server 130 over network 120. Client device 110 may include hardware and/or software configured to access a web service provided by network server 140.

The network browser 115 may initiate a request, such as a PHP request or other request, in response to user input or other event. In some embodiments, one or more requests may be initiated by network browser 115 as part of generating a web page for display through the browser.

Network 120 may be used to receive and process communication, including requests and responses, between client 110 and network server 130. In some embodiments, network 120 may also exist between other machines of FIG. 1, such as for example between network server 130 and 140, between application server 140 and data store 150, between controller 160 and client device 170, as well as other locations. Network 120 may include any public or private network for communicating data, such as for example a local area network, a wide area network, the internet, an intranet, a wireless network, a cellular network, or a combination of these networks.

Network server 130 may receive and process requests received from client 110 over network 120. Network server 130 may be implemented by the same machine or a different machine as application server 140. In some embodiments, a network server 130 may be an actual device or a logical device that processes requests and forwards requests or generates new requests to application server 140 to be serviced and returned to client 110.

Application server 140 may communicate with network server 130, datastore 150, and controller 160, and may include one or more applications 142. Application server 140 may be implemented on the same machine or a different machine as network server 130 and may include one or more PHP engines monitored by one or more agents within each application 142. An agent may track resource usage associated with a business transaction being processed by application 142. The resource usage may be tied to a business transaction to give better visibility of business transaction metrics than typical associations by URL.

Application server 144 and application 146 may be similar to application servers 140 and 142, respectively. Each of application servers 140 and 144 may communicate with data store 150 and controller 160, as well as with application server 140 (not illustrated). Data store 150 may receive requests from application servers 140 and 144, process the request, and transmit a response to the requesting server.

Controller 160 may receive data from application servers 140 and 144 and may manage monitoring of business transactions distributed over application servers. Controller 160 may receive runtime data from an agent in each application server, associate portions of business transaction data, communicate with agents to configure collection of runtime data, and provide performance data and reporting through an interface. The interface may be viewed as a web-based interface viewable by client device 170. In some instances, controller 190 may install or initiate installation of an agent into one or more application servers.

Client device 170 may be any device which may communicate with controller 160 and request data, such as resource usage by a business transaction for PHP requests.

Figure 2:
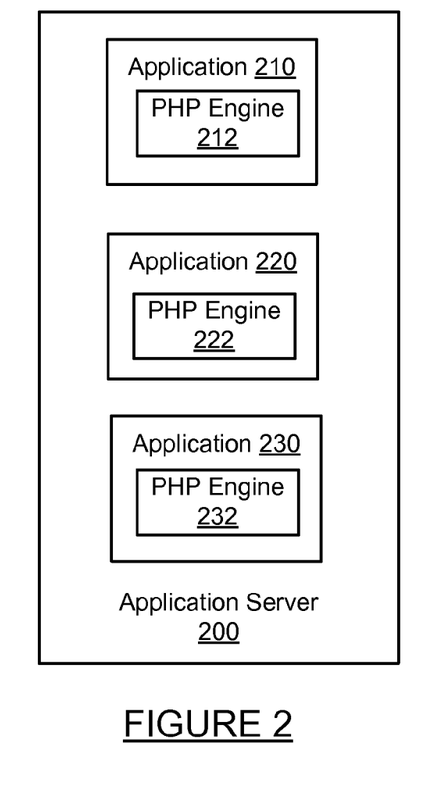
FIG. 2 is a block diagram of an application server.

FIG. 2 is a block diagram of an application server. The application server of FIG. 2 may be used to implement the application servers illustrated in FIG. 1. Application server 200 includes applications 210, 220 and 230. Each of the applications includes a PHP engine 212, 222, and 232, respectively. An application server may have any number of processes which execute a web request.

In some instances, any process may service any application. Each process may include a PHP engine, and a web server pool may include multiple web server processes. The web server pool may be included within a particular application. A PHP engine may execute a process for an application server, such as an "Apache" web server, and handle each application server process which handles a request. A PHP engine may operate to access a PHP script, parse the script, and execute the script. While executing the script, resources may be utilized based on the script commands, HTML may be generated, and the HTML is transmitted back to the requesting entity, such as a network browser, as part of processing the request.

Though illustrated with three applications, an application server may have more or fewer applications that that shown in FIG. 2.

Figure 3:
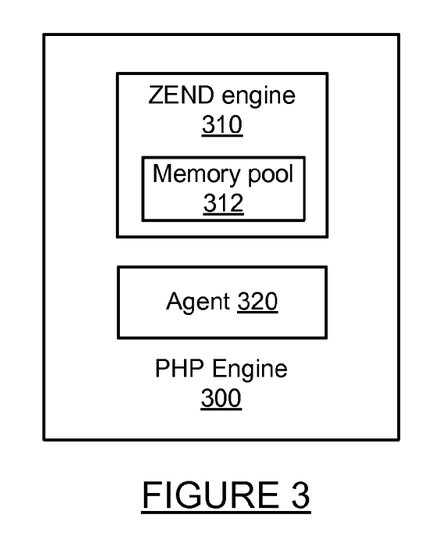
FIG. 3 is a block diagram of PHP engine.

FIG. 3 illustrates a block diagram of a PHP engine. PHP engine 300 of FIG. 3 includes a ZEND engine 310. ZEND engine 310 includes memory pool 312. PHP engine may also include an agent 320. A ZEND engine includes a memory pool and executes PHP scripts. At the start of a request, the memory pool creates a memory segment which is used by a script during execution. The memory segment grows and shrinks during execution and has a maximum size. Each PHP process handled by the application server is associated with a ZEND engine and a memory pool. In some embodiments, an agent within each PHP engine tracks the size of the corresponding memory pool to determine memory used by a particular resource. Usage of other resources may also be determined, such as for example a maximum CPU time, a number of file handles that are opened, number of objects used for a request, and other resource usage metrics.

Figure 4:
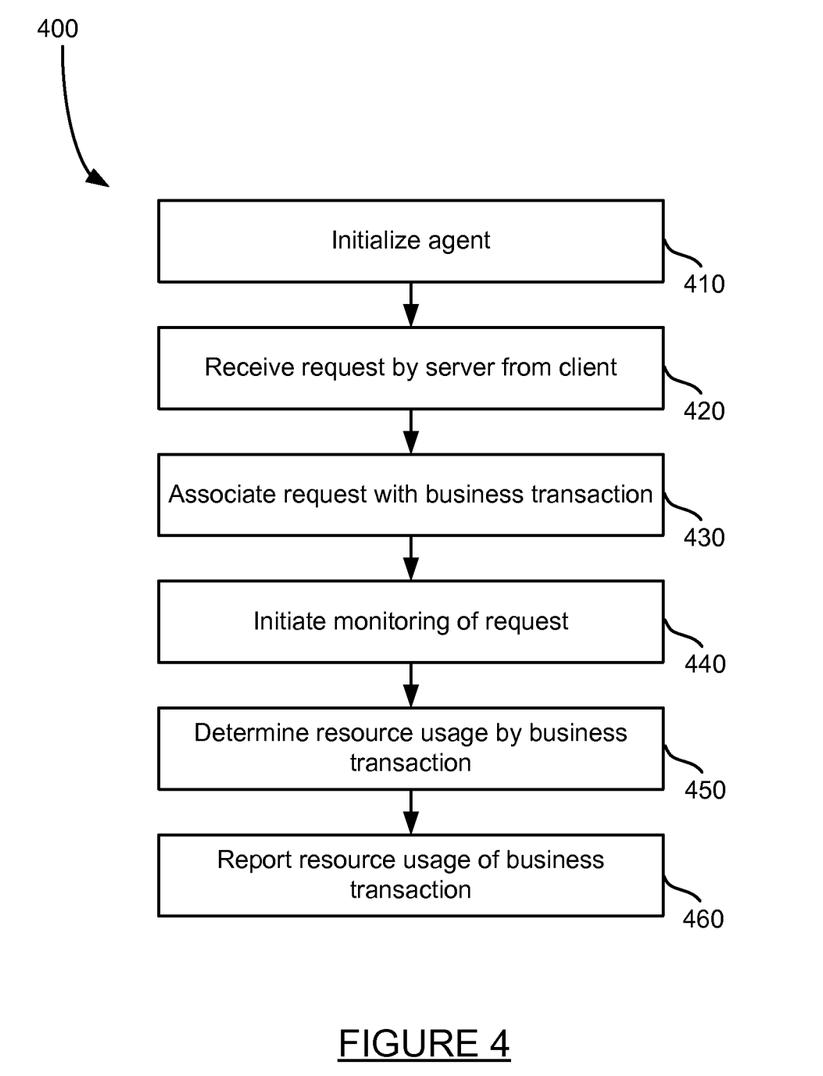
FIG. 4 is a method for monitoring a web based business transaction resource.

FIG. 4 implements a method for monitoring resource usage. The method begins with initializing an agent at step 410. Initializing an agent may include installing the agent and configuring the agent within a PHP engine. A request may eventually be received by a server from a client at step 420. The request may be a PHP request received by an application from network browser 115 over network 120. The request may be associated with a business transaction at step 430. Associating a request with a business transaction may include analyzing the request to determine the business transaction name and/or a business transaction identifier. For example, a business transaction name may be generated from a request header, request footer, a cookie associated with the request, or other data. In some embodiments, a business transaction may be identified with a unique identifier that is included in the request.

Monitoring of the request is initiated at step 440. An agent may receive the request and analyze the request to determine whether to monitor the request. In some embodiments, the agent may have a list of requests or conditions that indicate whether or not the request should be monitored. For example, a condition may specify that all transactions that start with "cart" or may specify an entry point in a framework should be monitored. Additional information regarding collecting data for analysis is discussed in U.S. patent application Ser. No. 12/878,919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Once monitoring of a request is initiated, resource usage by a business transaction is determined at step 450. Many types of resource usage may be monitored and associated with a business transaction. For example, an agent within a PHP engine may monitor a memory pool to determine the memory usage for a particular PHP request associated with a business transaction. In this case, the PHP code may expose a function that can be called to determine the current usage or maximum memory used. For a memory pool, an API may be used by an agent to get the current memory usage, the maximum memory size of the pool or other information. For example, a PHP API of "memory_get_usage( )" may be used to determine the number of bytes of memory currently in use for the particular PHP engine. Similarly, an API of "memory_get_peak_usage( )" may be used to determine the maximum size of the memory pool.

After determining resource usage by a request associated with a business transaction, the resource usage of a business transaction is reported at step 460. In some embodiments, agents monitoring PHP engines may report data to a proxy external to the PHP engine. The proxy may be located on the application server, or a machine outside of the PHP server. The proxy may receive the data, process the received data, aggregate the data, and report the aggregated data to a controller. The aggregated data may then be reported in a variety of formats. Step 460 is discussed in more detail with respect to the method of FIG. 5.

Figure 5:
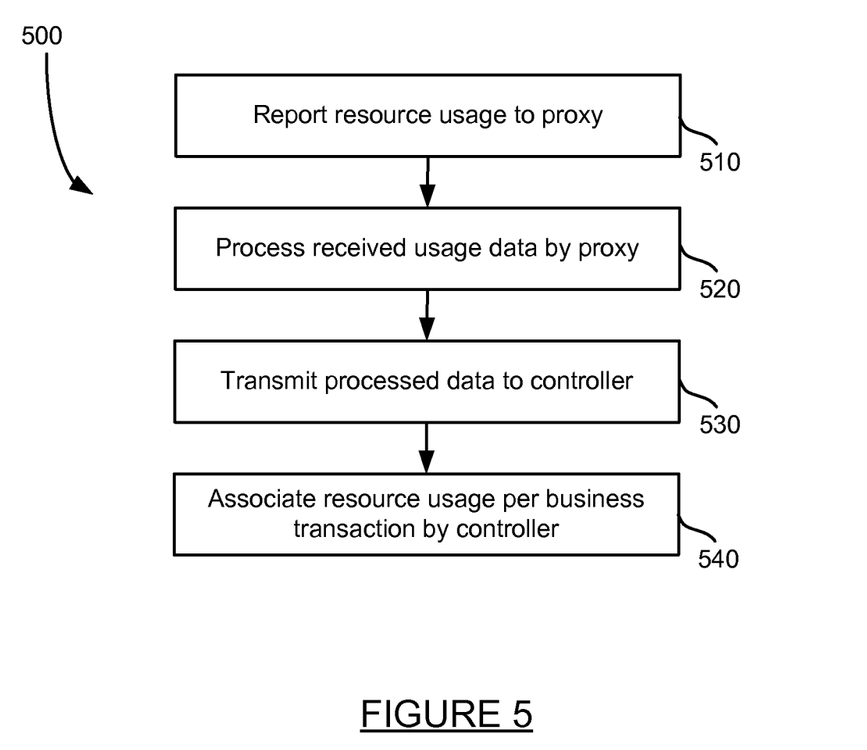
FIG. 5 is a method for providing business transaction resource usage to a user.

FIG. 5 illustrates a method for reporting resource usage of business transactions. The method of FIG. 5 provides more detail for step 460 of the method of FIG. 4. Resource usage data may be reported to a proxy at step 510. The usage is reported to the proxy by an agent within each of one or more PHP engines. The received usage data is processed by the proxy at step 520. The processing of the data may aggregate data into bins to determine average values, maximum, minimum, and other aspects of the data. The processed data is then transmitted from the proxy to a controller at step 530. The resource usage per business transaction is then determined by a controller at step 540. The controller may associate or "stitch" together a string of requests that comprise a business transaction using business transaction name information, business transaction identifiers, and other data received as part of the data provided by the agent. Once the requests that make up a business transaction are known, the resource usage for each request can be used to determine the total business transaction resource usage. For example, the sum of the memory space used by each request would result in the memory space used for the corresponding business transaction.

Figure 6:
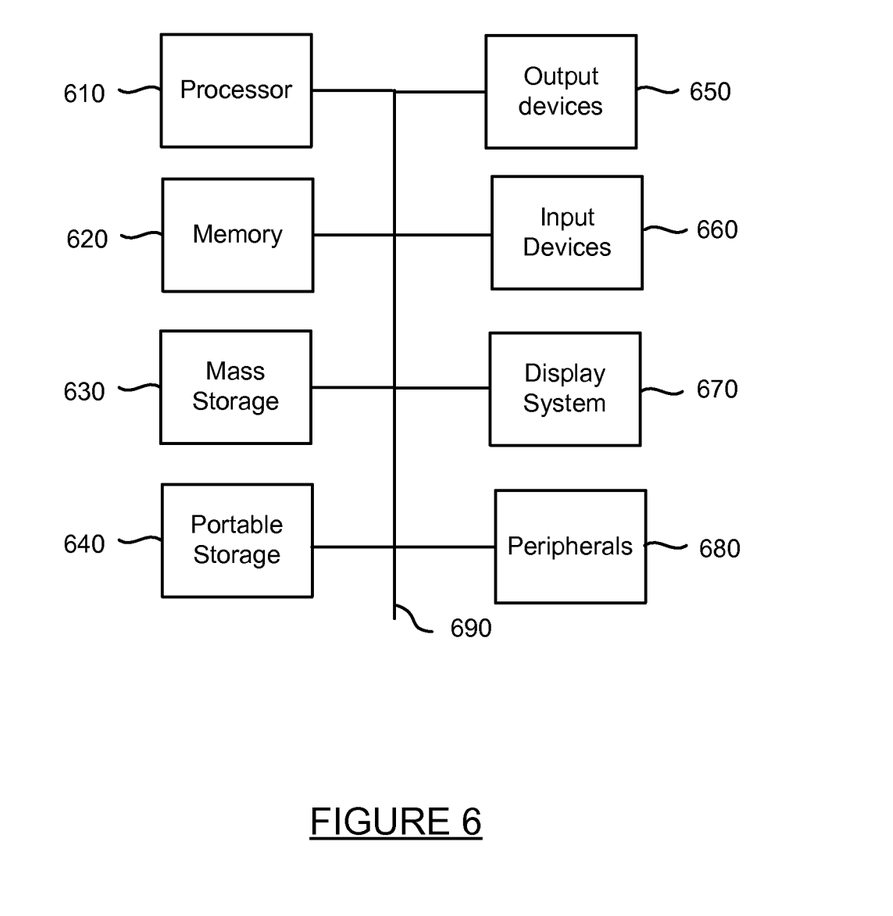
FIG. 6 is a system for implementing the present technology.

FIG. 6 is a block diagram of a computer system for implementing the present technology. System 600 of FIG. 6 may be implemented in the contexts of the likes of client 110, network server 130, application servers 140 and 144, data store 150, controller 160 and client device 170. A system similar to that in FIG. 6 may be used to implement a mobile device such as a smart phone, but may include additional components such as an antenna, additional microphones, and other components typically found in mobile devices such as a smart phone or tablet computer.

The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a business transaction and associated resource usage, the method comprising:
   receiving, by a server, a plurality of PHP: hypertext preprocessor (PHP) requests;
   analyzing, by an agent installed on the server, each PHP request to detect an identifier representing a business transaction associated with each received PHP request;
   initiating monitoring of the received PHP requests by the agent, each associated with a corresponding business transaction;
   determining resource usage, by the agent, by each PHP request associated with the corresponding business transaction as each PHP request is executed;
   stitching together the determined resource usage by all PHP requests, from the received PHP requests, associated with the same business transaction based on the determined identifier for each PHP request; and
   reporting the stitched together resource usage by the PHP requests associated with the same business transaction to indicate a total resource usage for the same business transaction.

2. The method of claim 1, including determining a business transaction associated with each PHP request based on the identifier.

3. The method of claim 1, wherein determining the resource usage includes determining a memory metric associated with each PHP request.

4. The method of claim 3, wherein determining the memory metric includes retrieving a ZEND engine memory pool size.

5. The method of claim 1, wherein determining the resource usage includes determining a processing time associated with the PHP request.

6. The method of claim 1, including:
reporting the resource usage to an external server; and
determining the total resource usage for the business transaction by the external server.

7. The method of claim 1, wherein each PHP request is associated with a business transaction by an agent that resides on a server that receives the PHP request.

8. A non-transitory computer readable storage medium having embodied thereon a program, the program being executable by a processor to perform operations for monitoring a business transaction, the operations including:
receiving, by a server, a plurality of PHP: hypertext preprocessor (PHP) requests;
analyzing, by an agent installed on the server, each PHP request to detect an identifier representing a business transaction associated with each received PHP request;
initiating monitoring of the received PHP requests by the agent, each associated with a corresponding business transaction;
determining resource usage, by the agent, by each PHP request associated with the corresponding business transaction as each PHP request is executed;
stitching together the determined resource usage by all PHP requests, from the received PHP requests, associated with the same business transaction based on the determined identifier for each PHP request; and
reporting the stitched together resource usage by the PHP requests associated with the same business transaction to indicate a total resource usage for the same business transaction.

9. The non-transitory computer readable storage medium of claim 8, wherein the operations include determining a business transaction associated with each PHP request based on the identifier.

10. The non-transitory computer readable storage medium of claim 8, wherein determining the resource usage includes determining a memory metric associated with each PHP request.

11. The non-transitory computer readable storage medium of claim 10, wherein determining the memory metric includes retrieving a ZEND engine memory pool size.

12. The non-transitory computer readable storage medium of claim 8, wherein determining the resource usage includes determining a processing time associated with each PHP request.

13. The non-transitory computer readable storage medium of claim 8, wherein the operations include reporting the resource usage to an external server to be associated with a business transaction by the external server.

14. The non-transitory computer readable storage medium of claim 8, wherein each PHP request is associated with a business transaction by an agent that resides on a server that receives each PHP request.

15. A system for monitoring a business transaction, the system comprising:
a processor;
a memory; and
one or more modules stored in the memory and executed by the processor to perform operations including:
receive a plurality of PHP: hypertext preprocessor (PHP) requests;
analyze, by an agent installed on the server, each PHP request to detect an identifier representing a business transaction associated with each received PHP request;
initiate monitoring of the received PHP requests by the agent, each associated with a corresponding business transaction;
determine resource usage, by the agent, by each PHP request associated with the corresponding business transaction as each PHP request is executed;
stitch together the determined resource usage by all PHP requests, from the received PHP requests, associated with the same business transaction based on the determined identifier for each PHP request; and
report the stitched together resource usage by the PHP requests associated with the same business transaction to indicate a total resource usage for the same business transaction.

16. The system of claim 15, wherein the one or more modules are executable to determine a business transaction associated with the request based on the identifier.

17. The system of claim 15, wherein the one or more modules are executable to determine the resource usage by determining a memory metric associated with each PHP request.

18. The system of claim 17, wherein the one or more modules are executable to determine the memory metric including retrieve a ZEND engine memory pool size.

19. The system of claim 15, wherein the one or more modules are executable to determine the resource usage by determining a processing time associated with each PHP request.

20. The system of claim 15, wherein the one or more modules are executable to report the resource usage to an external server to be associated with a business transaction by the external server.

21. The system of claim 15, wherein each PHP request is associated with a business transaction by an agent that resides on a server that receives the PHP request.

* * * * *